| United States Patent [19] | [11] Patent Number: 4,743,668 |
| Fong et al. | [45] Date of Patent: May 10, 1988 |

[54] N-ACETOACETYL (METH)ACRYLAMIDE POLYMERS

[75] Inventors: Dodd W. Fong, Naperville; Jeffrey R. Cramm, Winfield, both of Ill.

[73] Assignee: Nalco Chemical Company, Naperville, Ill.

[21] Appl. No.: 26,599

[22] Filed: Mar. 17, 1987

[51] Int. Cl.$^4$ .............................................. C08F 20/58
[52] U.S. Cl. ................................................... 526/304
[58] Field of Search ......................................... 526/304

[56] References Cited

U.S. PATENT DOCUMENTS 4,346,231  8/1982  Ponticello et al. ................... 526/263
4,421,915  12/1983  Ponticello et al. ................... 526/263

Primary Examiner—Joseph L. Schofer
Assistant Examiner—N. Sarofim
Attorney, Agent, or Firm—John G. Premo; Anthony L. Cupoli; Donald G. Epple

[57] ABSTRACT

A vinyl polymer containing at least 1 mole percent of N-acetoacetylacrylamide monomer.

8 Claims, No Drawings

N-ACETOACETYL (METH)ACRYLAMIDE POLYMERS

INTRODUCTION

Modified acrylamide monomers are being used with more frequency to achieve improved results when combined in polymeric backbones. Some of these results include water treatment where corrosion improvement is achieved or where deposit control is achieved on surfaces in contact with industrial waters, particularly cooling waters, industrial boilers and like applications. Similarly some of the modified acrylamide monomer containing polymers have found improved uses in coagulation, flocculation, dewatering of wet slurries and the like.

New polymers can be created by including in the vinylic polymerization reaction modified acrylamide which contains acetyl acetonate type substitution. These monomers have been called to the attention of the artisan in several references, for example, an article entitled "Synthesis of N-Acylacetoacetamide using 2,2,6-Trimethyl-1,3-dioxin-4-one" by Sato, et al which appeared in *Chem. Pharm. Bull.*, 30(4) 1315–1321(1982), which is incorporated herein by reference. Also "A New Method for Preparation for N-Acetoacetyl-Carboxamides" is reported by Yamamoto, et al, as reported in *Synthesis Communications*, Feb. 1981, Pages 122–124, which is also incorporated herein by reference. Neither of these references teach the polymerization of the substituted acrylamide monomer which they claimed was synthesized.

Acrylamide monomers substituted by acetyl acetonate type functionality would be expected to be useful in metal chelation and hence possibly useful to inhibit precipitation of metal salts, and possibly also useful to inhibit scale formation or corrosion which may occur on metal surfaces in contact with waters of an industrial nature. It would therefore be an improvement in the art if polymers of the N-acetoacetylacrylamide mononer could be routinely obtained.

It is an object of this invention to teach an improved method of synthesizing the monomer-N-acetoacetylacrylamide and to use this monomer in vinylic polymerizations to achieve vinyl polymers containing at least 1 mole percent of this monomer.

THE INVENTION

Our invention is therefore a vinyl polymer which contains at least 1 mole percent of N-acetoacetylacrylamide monomer. This N-acetoacetylacrylamide monomer is represented by the structures that follows:

Structure I

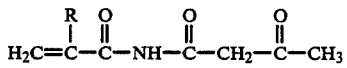

wherein R is H, CH$_3$, or mixtures thereof.

Structure I is found to be in equilibrium with its eno form illustrated as Structure II below:

Structure II

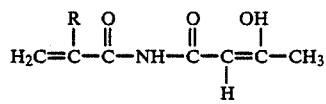

wherein R is H, CH$_3$, or mixtures thereof.

These substituted acrylamides can be polymerized using certain vinyl polymerization techniques to achieve either homopolymers or copolymers or even terpolymers and above by reacting either the N-acetoacetylacrylamide monomer by itself or by reacting this substituted acrylamide monomer with other vinylic monomers such as acrylic acid, metacrylic acid, acrylamide, methacrylamide, acrylonitrile, vinyl acetate, vinyl ether, maleic anhydride, styrene, divinyl benzene, butyl (meth)acrylate, 2-ethylhexyl (meth)acrylate, stearyl (meth)acrylate or mixtures thereof.

The vinyl polymers containing N-acetoacetylacrylamide monomer preferably contain at least 1 mole percent of this substituted acrylamide monomer. Preferably these vinyl polymers contain at least 15 mole percent of the N-acetoacetylacrylamide monomer and can contain 100 mole percent of this monomer when the homopolymer is desired.

Preferred copolymers containing the N-acetoacetylacrylamide monomer contain at least 1 mole percent of this substituted acrylamide monomer and at least 20 mole percent of a vinyl monomer chosen from the group consisting of acrylic acid, methacrylic acid, acrylamide, methacrylamide, vinyl acetate, vinyl ether, maleic anhydride or mixtures thereof.

The vinyl polymers which contain at least 1 mole percent N-acetoacetylacrylamide monomer can be made having a weight average molecular weight of at least 1000 and preferably they can be made having a moleculer weight ranging between about 1000 to about 1,000,000 or more.

The copolymers which contain N-acetoacetylacrylamide monomer may also be made with molecular weights of at least 1000 or which have molecular weights ranging between about 1000 to about 1,000,000 or above depending upon the use to which the polymer will be put. Normally, if the polymer is to act as a corrosion inhibitor, the molecular weights range between about 1000 to about 100,000 for both the homopolymer or the copolymer. Preferably, the molecular weight will range between about 1000 to about 50,000.

If the polymers are to be put to a flocculant use or a use related to the settling of suspended solids or the treatment of suspended solids for dewatering purposes, the molecular weight will range between about 100,000 to about 1,000,000 or above, in some cases, perhaps as high as 10,000,000–25,000,000.

Finally, these N-acetoacetylacrylamide containing polymers may themselves be usefully modified by simple reactions of the polymer containing this unique substituted acrylamide monomer with at least 1 mole percent, based on the polymer content of N-acetoacetylacrylamide, of a bisulfite salt per mole of N-acetoacetylacrylamide monomer contained within a vinyl polymer derived therefrom. These reactions modifying vinyl polymers containing N-acetoacetylacrylamide monomer then achieves a sulfonate substituted material illustrated by Structure III below:

Structure III

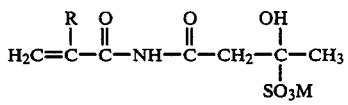

wherein R is hydrogen, methyl, or mixtures thereof, and wherein M is hydrogen, sodium, potassium, ammonium, or other water-soluble cations which are electroneutral to the anionic charge on the sulfonate functional group. These sulfonate containing modified N-acetoacetylacrylamide containing polymers may have similar uses as those described above and may derive improvements when the sulfonate group can act to do so.

EXAMPLES

Having generally described out invention, we now present several examples of an improved synthesis of the N-acetoacetylacrylamide monomer and the use of this monomer to obtain homopolymers and copolymers. The improved methods of synthesizing this unique monomer are acheived by reacting an acrylamide or methacrylamide monomer, or mixtures thereof, with the reactant 2, 2, 4-trimethyl-6-keto-1,3 dioxene in a common solvent at a temperature of at least 100° C., and preferably at least 120° C. in the presence of an effective amount of a polymerization inhibitor to inhibit undesirable pre-polymerization reactions.

EXAMPLE 1

425 grams of xylene was heated to reflux temperatures in a 1 liter flask heated by an oil bath. About 60 milliliters of this xylene was distilled from this flask to azeotrope and remove any water contained within the xylene solvent. The solvent was cooled under a nitrogen purge to about 110° C.

To this dried xylene was added 2.3 grams phenothiazine followed by 21.3 grams of the acrylamide monomer. The temperature of the admixture was approximately 100° C. when 42.6 grams of 2,2,4-trimethyl-6-keto-1,3 dioxene (hereinafter referred to as TKD) was added to this solution and mechanical stirring initiated. The admixture was gradually heated to temperatures ranging from 110°-135° C. and acetone was evolved and removed from the reaction mixture by distillation.

When the boiling point of the distillate reached 135° C. the heat source was removed and the reaction mixture allowed to cool to 90° C. The mixture was filtered hot at this temperature and the filtrate was slowly cooled to 0° C. causing crystallization of the product. The crystals were collected by filtration and dried to obtain 32 grams of product. Additional evaporation of the filtrate led to a second and third crop of crystals following similar steps described above, and 4-5 grams of additional product was collected. The product was recrystallilzed from acetone to ensure complete removal of the inhibitor.

Following techniques similar to that described above, a supply of pure white crystals which were analyzed as being the N-acetoacetylacrylamide monomer was obtained and used in later experiments to polymerize this monomer to obtain either homopolymers or copolymer or terpolymers when using other monomers as previously described.

In the above experiment phenothiazine is a polymerization inhibitor which is required to achieve high yields of the substituted acrylamide monomer. Other polymerization inhibitors soluble in the common solvent would also be expected to enhance the yields of product obtained in the reaction. The yields described above can be increased if the reaction temperature is maintained above 100° C. and preferably above 120° C. during the addition of TKD. The addition of TKD is preferably made drop-wise or at least in a controlled continuous manner with efficient stirring and heating over a reaction period of about 30 minutes. Controlled reaction conditions of the type described can minimize or eliminate completely the formation of any polymer residue or other side reaction products obtained during this reaction when using the polymerization inhibitor.

Using the described techniques, the yield of N-acetoacetylacrylamide monomer from the reaction of acrylamide monomer and TKD can achieve at least 80% of theoretical calculations, or above.

EXAMPLE 2

The monomer derived by reactions similar to or identical to those described above was polymerized following the procedures below:

One gram of N-acetoacetylacrylamide monomer was dissolved in 32 grams of tertiary butanol. This butanol solution was purged with nitrogen and warmed to a temperature of about 70° C. About 0.5 grams of a tertiary butanol solution containing 0.02 grams of 2,2'-azobis(2,4 dimethylvaleronitrile) was added.

The reaction mixture was held at a temperature of 70° C. for 3 hours. The polymer precipitated as it was formed. At the end of the reaction time, the vessel contents were cooled to about room temperature and filtered. The residue was dried under vacuum to obtain 0.98 grams of a white powder which was analyzed as the homopolymer of N-acetoacetylacrylamide. Infra Red spectra showed the presence of 3 carboxyl group stretches and the absence of any vinyl substituent which indicated that the polymerization had been complete. The weight average molecular weight of this homopolymer was about 4300, the number average molecular weight was about 1800, and the polydispersity of this polymer measured at about 2.3. The molecular weight was determined by GPC using polystyrene sulfonate standard.

EXAMPLE 3

The N-acetoacetylacrylamide monomer was copolymerized with the following monomers:
1. Acrylic acid
2. Acrylamide
3. Vinyl acetate The acrylic acid polymerization was complete when the acrylic acid monomer was in the free acid form, in the sodium salt form, or in admixture of free acid and sodium salt forms.

Typical of the reaction of N-acetoactylacrylamide with acrylic acid or sodium acrylate is the following procedure:

A 20% percent by weight solution of sodium acrylate in water was prepared and treated with carbon to remove the inhibitor. The pH of the resulting solutions was 7.2.

A monomeric mixture containing 72 grams water, 1.75 grams N-acetoacetylacrylamide and 16.25 grams of the above sodium acrylate solution was made up at room temperature and warmed at about 70° C. This solution was purged with nitrogen and an initiator solution containing 0.31 grams of a 2,2'-azobis(2-amidinopropane)hydrochloride in 9.7 grams of water was added to this monomer mixture. The combined reaction mixture was heated to 65°–70° C. for a period of 4 hours. Analysis indicated a copolymer containing about 4:1 mole ratio of sodium acrylate to N-acetoacetylacrylamide. The copolymer had a weight average molecular weight of about 7800, a number average molecular weight of about 3400, and a polydispersity of about 2.3.

EXAMPLE 4

A 20 mole percent N-acetoacetylacrylamide copolymer with acrylic acid was prepared by polymerizing a reaction mixture containing 9.75 grams acrylic acid, 5.25 grams substituted acrylamide and 74 grams of water. This reaction mixture was warmed to 70° C.

The clear solution was warmed to 72° C. and purged with nitrogen, whereupon a solution of 0.93 grams 2,2'-azobis (2-amidinopropane) hydrochloride dissolved in 10 grams of water was added.

Upon addition of the free radical catalyst above the temperature of the reaction vessel contents rose rapidly to about 90° C. and required cooling with the water bath until the reaction temperture returned to 70° C. The reaction solution was stirred at 70° C. for 3.5 hours. Some of the polymer precipitated upon cooling but was redissolved by partial neutralization with sodium hydroxide. The molecular weight was so high as to be excluded from a gel permeation chromatography column. The molecular weight must therefore exceed 100,000.

EXAMPLE 5

A copolymer of N-acetoacetylacrylamide with vinyl acetate was prepared as follows: 7.75 grams (0.09 moles) vinyl acetate was dissolved in 8.0 grams methanol and purged with nitrogen. This solution was warmed to reflux under a nitrogen atmosphere and a solution of 0.25 grams/2,2'-azobis (2,4-dimethylvaleronitrile) in 1 gram of methanol was added. To this admixture a solution of 1.55 grams (0.01 moles) of the N-acetoacetylacrylamide dissolved in 20 grams of methanol was slowly added in 1 hour using a syringe pump. This solution was refluxed for an additional 2 hours after all of the ingredients had been added. Unreacted vinyl acetate and methanol solvent were removed on a rotovap to yield about 5 grams of a copolymer containing vinyl acetate and N-acetoacetylacrylamide. This polymer was not soluble in water but was soluble in organic solvents.

EXAMPLE 6

The substituted N-acetoacetylacrylamide monomer was reacted with acrylamide monomer at a mole ratio of about 3 moles acrylamide per mole of N-acetoacetylacrylamide. A 10% solids solution polymer was obtained by reacting 5.8 grams of acrylamide and 4.2 grams of N-acetoacetylacrylamide in 83 grams of water. The monomer solution was purged with nitrogen and heated to a temperature of about 65° C. One gram of 2,2'-azobis (2-amidinopropane)hydrochloride was dissolved in 6 grams of water and added to the admixture. The reaction mixture temperature rose to about 75° C. and then dropped back to 70° C. where it was held for about 3.5 hours, then the reaction vessel contents were cooled to room temperature. An extremely viscous polymeric solution was obtained. The molecular weight of the polymer was though to exceed 100,000.

EXAMPLE 7

The reaction of a homopolymer N-acetoacetylacrylamide with sodium bisulfite was achieved as follows:

0.2 grams of the homopolymer obtained as described in Example 2 above was suspended in water (about 4 grams). To this aqueous suspension was added 0.13 grams sodium hydrogen sulfite (NaHSO$_3$) and this admixture stirred at room temperature for about 2 hours. During this reaction time all of the homopolymer dissolved to form a clear colorless solution. The infra-Red analysis showed the presence of carbonyl groups and, sulfonate groups, which indicated that a polymer containing monomers described as (Structure III) had been obtained. Additional evidence of this modification of the homopolymer of N-acetoacetylacrylamide was the observation that reaction at room temperature yielded a water-soluble product from a material which had originally been an insoluble suspension of homopolymer in water.

EXAMPLE 8

Low molecular weight copolymer of acrylic acid and N-acetoacetylacrylamide was prepared as a 15 weight percent solids solution in 2-propanol. 9.75 grams of acrylic acid and, 5.25 grams of the substituted acrylamide were dissolved in 83.5 grams of isopropanol. This solution was purged with nitrogen and heated to 80° C. To this solution was added 1.5 grams tertiary butylperoxyoctoate. The solvent solution contained in the reaction vessel quickly began to reflux. The polymerization was run at a temperature of 80°–85° C. for a period fo about 3 hours. The 2-propanol was removed on a rotovap and the polymer obtained was redissolved in water by partial neutralization with sodium hydroxide. The polymer was measured as having a weight average molecular weight of about 7010.

EXAMPLE 9

A 15 weight percent solution of copolymer of acrylic acid and N-acetoacetylacrylamide was obtained in water by reactin 9.75 grams acrylic acid and 5.25 grams of the substituted acrylamide of this invention, dissolved in 72 grams distilled water. This mixture was purged with nitrogen and heated to a temperature of about 60° C. To this admixture 0.75 grams of ammonium persulfate was added and solution stirred for 30 seconds to complete dissolution of this ammonium persulfate. A solution of sodium metabisulfite (2.25 grams) in 10 grams of water was then added quickly. Within 60 seconds of the addition of the sodium metabisulfite co-catalyst, the temperature of the reaction mixture rose from 60° C. to 80° C. indicating polymerization was occurring. This solution was allowed to cool to 60° C. and was held at that temperature of a reaction period of 3 hours. The copolymer obtained had a weight average molecular weight of about 20,200.

Using similar reaction conditions as described above with other types of free radical catalyst initiators such as succinic acid peroxide or ammonium persulfite in combination with 3-mercaptopropionic acid, other copolymers of the N-acetoacetylacrylamide monomer with acrylic acid or partially neutralized acrylic acid have been obtained. The polymers had molecular weights ranging between about 5000 to about 80,000. Of particular interest was a polymer solution containing 15 weight percent of a polymer having a mole ratio of acrylic acid to N-acetoacetylacrylamide of about 4:1 and a molecular weight of about 71,000.

Several of the copolymers containing N-acetoacetylacrylamide and acrylic acid were reacted with sodium bisulfite in aqueous solution. All of the reactions succeeded in achieving substitution of bisulfite to obtain polymers containing sulfonate acid functionality or its water soluble salts.

Having described our invention, we claim:

1. A vinyl polymer containing at least 1 mole percent of N-acetoacetylacrylamide monomer.

2. The vinyl polymer of claim 1 which also contains at least 20 mole percent of a vinyl monomer chosen from the group consisting of acrylic acid, methacrylic acid, acrylamide, methacrylamide, acrylonitrile, vinyl acetate, vinyl ether, maleic anhydride, styrene, divinyl benzene, butyl (meth)acrylate, 2-ethylhexyl (meth)acrylate, or mixtures thereof.

3. The vinyl polymer of claim 1 or claim 2 which contains at least 5 mole percent of N-acetoacetylacrylamide monomer.

4. The vinyl polymer of claim 1 having weight average molecular weight of at least 1000.

5. The vinyl polymer of claim 2 having a weight average molecular weight of at least 1000.

6. The vinyl polymers of claim 3 having a weight average molecular weight ranging between about 1000–1,000,000.

7. The vinyl polymer of either claim 4 or claim 5 having a molecular weight ranging between about 1000 to about 1,000,000.

8. The vinyl polymer of claim 1 or claim 2 which has been modified by reacting therewith at least 5 mole percent of a bisulfite salt per mole of N-acetoacetylacrylamide monomer contained therein.

* * * * *